(12) United States Patent
Elrod et al.

(10) Patent No.: US 12,102,164 B2
(45) Date of Patent: Oct. 1, 2024

(54) AUGMENTED SITUATIONAL AWARENESS HUB

(71) Applicant: S.W.O.R.D. International Inc., Greenville, SC (US)

(72) Inventors: Jeremy Allen Elrod, Reno, NV (US); Christopher Collin Klaftenegger, Reno, NV (US)

(73) Assignee: S.W.O.R.D. INTERNATIONAL INC., Greenville, SC (US)

( * ) Notice: Subject to any disclaimer, the term of this patent is extended or adjusted under 35 U.S.C. 154(b) by 0 days.

(21) Appl. No.: 18/171,086

(22) Filed: Feb. 17, 2023

(65) Prior Publication Data
US 2023/0270197 A1    Aug. 31, 2023

Related U.S. Application Data

(63) Continuation of application No. 17/148,550, filed on Jan. 13, 2021, now Pat. No. 11,583,027.

(60) Provisional application No. 62/960,572, filed on Jan. 13, 2020.

(51) Int. Cl.
| | |
|---|---|
| *A42B 3/30* | (2006.01) |
| *A63G 31/00* | (2006.01) |
| *G01C 5/06* | (2006.01) |
| *G01C 21/00* | (2006.01) |
| *G06F 3/14* | (2006.01) |
| *G08B 21/18* | (2006.01) |
| *H04Q 9/00* | (2006.01) |
| *H04N 23/57* | (2023.01) |

(52) U.S. Cl.
CPC ............... *A42B 3/30* (2013.01); *A63G 31/00* (2013.01); *G01C 5/06* (2013.01); *G01C 21/005* (2013.01); *G06F 3/14* (2013.01); *G08B 21/182* (2013.01); *H04Q 9/00* (2013.01); *A63G 2031/005* (2013.01); *H04N 23/57* (2023.01)

(58) Field of Classification Search
CPC .... A42B 3/30; A63G 31/00; A63G 2031/005; G01C 5/06; G01C 21/005; G06F 3/14; G08B 21/182; H04Q 9/00; H04N 23/57
See application file for complete search history.

(56) References Cited

U.S. PATENT DOCUMENTS

| | | | | |
|---|---|---|---|---|
| 8,860,570 | B2 * | 10/2014 | Thomas ............. | G08B 21/0446 340/436 |
| 2016/0309827 | A1 * | 10/2016 | Dodson ................ | A42B 3/0426 |
| 2017/0048496 | A1 * | 2/2017 | Hobby .................. | A42B 3/042 |
| 2018/0007994 | A1 * | 1/2018 | Boesen ................. | A42B 3/30 |
| 2018/0188813 | A1 * | 7/2018 | Saez ..................... | G06F 3/005 |
| 2020/0128902 | A1 * | 4/2020 | Brown .................. | A42B 3/30 |

* cited by examiner

*Primary Examiner* — Kenneth B Lee, Jr.
(74) *Attorney, Agent, or Firm* — VLP Law Group, LLP (57) ABSTRACT

A sensor hub for collecting sensor data during a parachuting or wing-suite event is described herein. In some instances, the sensor hub may include a sensor hub housing, the sensor hub housing including a first cavity that houses a power supply and a communication unit and a second cavity that houses a location sensor and an orientation sensor, wherein the communication unit is configured to share the location sensor and the orientation sensor with a second sensor hub and a helmet that attaches to the sensor hub housing.

20 Claims, 8 Drawing Sheets

AUGMENTED SITUATIONAL AWARENESS HUB

BACKGROUND

The present disclosure relates to technology for, among other things, a system for augmented situational awareness sensors that capture data during a parachute or wing-suite event.

Current sensor data that is used during a parachute jump or other type of similar event includes various separate sensors that are monitored by the jumper. For example, the jumper may monitor their altitude using an altimeter. Other sensors may separately capture data, such as temperature and speed during the jump that the jumper can view. However, these separate sensors are all independent and the jumper is required to monitor the various sensors independently during the jump. Additionally, current systems lack the ability to offer real-time video and inertial measurement data from any and all nodal and gateway connections.

SUMMARY

According to one innovative aspect of the subject matter described in this disclosure, an augmented situational awareness hub includes a sensor hub including a sensor hub housing, the sensor hub housing including a first cavity that houses a power supply and a communication unit and a second cavity that houses a first sensor and a second sensor that are configured to capture sensor data during an event; and a helmet that attaches to the sensor hub housing to secure the sensor hub during the event.

Implementations may include one or more of the following features. The augmented situational awareness hub where the event is a parachute jump out of an airplane. The sensor hub further includes a processor configured to analyze the sensor data captured by the first sensor and the second sensor in substantially real-time. The processor is further configured to identify an alert based on the analysis of the sensor data. The alert is identified based on the sensor data exceeding a threshold value. The first sensor and the second sensor are one or more of a location sensor, an orientation sensor, an inertial measurement unit, and a camera. The sensor hub further includes a strobe device that emits a strobe when activated. The strobe device is a removable smart strobe. The sensor hub further includes a lighting system that emits a light when activated. The lighting system is one of a forward flood light and an area light. The sensor hub is a first sensor hub and the communication unit is configured to communicate with a second sensor hub to share sensor data from the first sensor hub with the second sensor hub. The communication unit includes a passive antenna that can provide location information after an active system in the communication unit is inoperable. The augmented situational awareness hub may include: a heads-up display that is configured to receive the sensor data and display the sensor data on the heads-up display for presentation to a user. The sensor data includes one or more of a position of the sensor hub, an acceleration of the sensor hub, a gyro of the sensor hub, an airspeed of the sensor hub, a barometric pressure, a humidity, and a temperature.

One general aspect includes a method of capturing sensor data using an augmented situational awareness hub. The method of capturing sensor data also includes capturing, using one or more sensors of a sensor hub, sensor data; analyzing, using a processor of the sensor hub, the sensor data by comparing the sensor data to a model of expected sensor data; identifying, using the processor of the sensor hub, an alert from the sensor data based on the comparison of the sensor data to the model of expected sensor data; sharing, using a communication unit of the sensor hub, the alert on a heads-up display connected to the sensor hub; and sharing, using the communication unit of the sensor hub, the sensor data with a remote device. Other embodiments of this aspect include corresponding computer systems, apparatus, and computer programs recorded on one or more computer storage devices, each configured to perform the actions of the methods.

Implementations may include one or more of the following features. The method where the sensor hub is a first sensor hub and the remote device is a second sensor hub of a second user. The sensor data is captured during a parachute event out of an airplane. The sensor hub is mounted to a helmet of a user. The alert is an update in a flight path of the sensor data, the update being determined by the processor of the sensor hub using the sensor data. Implementations of the described techniques may include hardware, a method or process, or computer software on a computer-accessible medium.

One general aspect includes an augmented situational awareness hub that also includes an orientation sensor mounted into a sensor hub, the orientation sensor being configured to capture orientation data during a parachute jump; an altitude sensor mounted into the sensor hub, the altitude sensor being configured to capture altitude data during the parachute jump; a location sensor mounted into the sensor hub, the location sensor being configured to capture location data during the parachute jump; a lighting system mounted into the sensor hub, the lighting system being configured to emit light during the parachute jump; a strobe device mounted into the sensor hub, the strobe device being configured to emit a strobe during the parachute jump; a processor mounted into the sensor hub, the processor being coupled to the orientation sensor, the altitude sensor, the location sensor and the lighting system in order to receive the orientation data, the altitude data, and the location data; and a communication unit mounted into the sensor hub, the communication unit being configured to receive the orientation data, the altitude data, and the location data from the processor and transmit the orientation data, the altitude data, and the location data to a remote device.

The features and advantages described herein are not all-inclusive and many additional features and advantages will be apparent to one or ordinary skill in the art in view of the figures and description. Moreover, it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology disclosed in this application uses a system of data sensors mounted into a sensor hub. The data sensors are configured to capture various types of data and act as a black box recording device for whatever the hub is mounted to. In some example implementation, the sensor hub may be mounted to a helmet, such as a helmet for a parachutist or wing-suit flyer. The sensor hub may capture data from the various sensors related to the jump, such as during free-fall or under canopy. This data capture by the sensor hub may be used in one implementation as a black box recording device where the data about the jump and the user is captured, such as in an accident investigation. In further implementations, the sensor hub may provide real-time data about the jump to the user or others monitoring the jump, such as for asset tracking capabilities, asset awareness, or recoveries, etc. In further implementations, the sensor hub may be able to provide real-time instructions or updates to a user, such as via a heads-up display ("HUD") technology in order to update or assist the user during the jump.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1A:
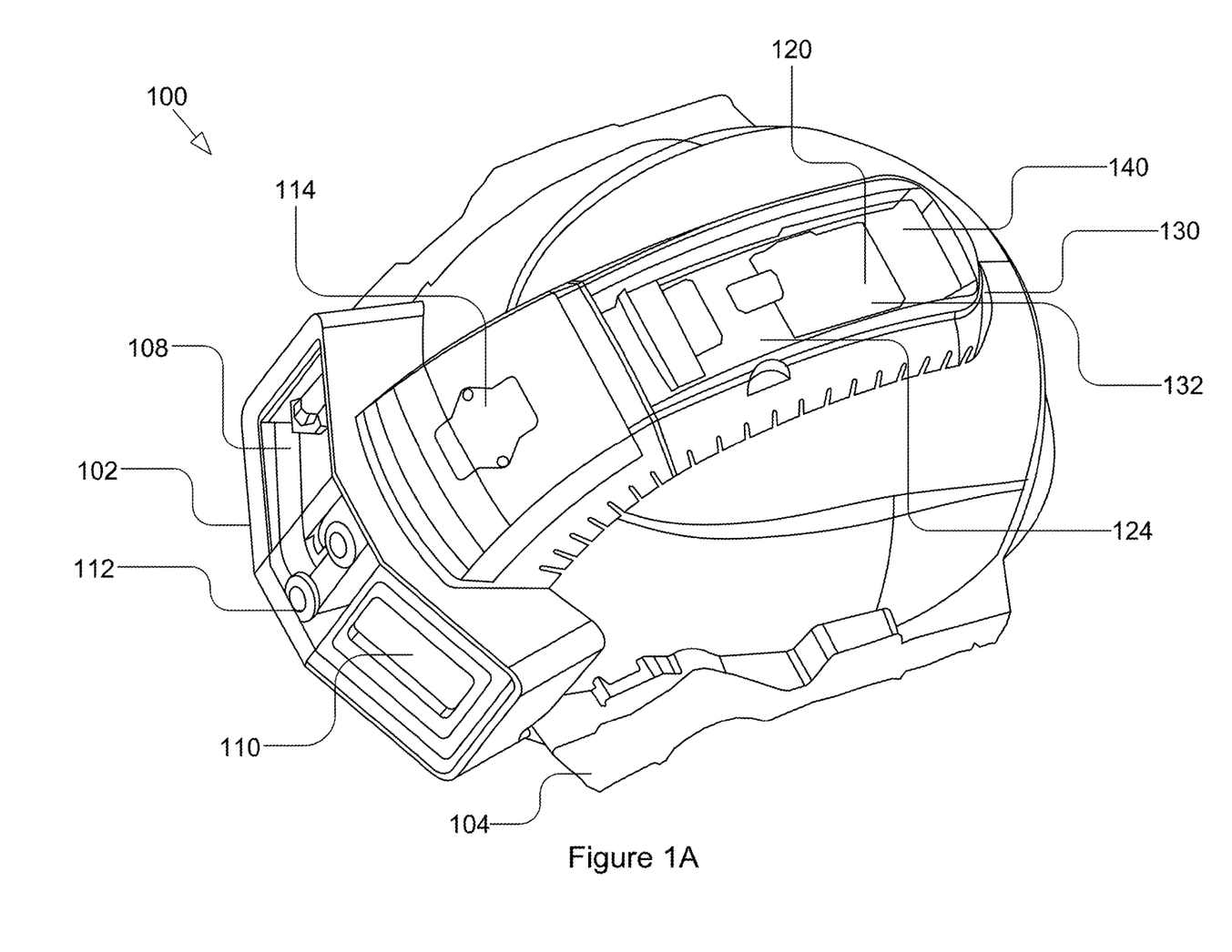
FIGS. 1A and 1B are an example illustration and block diagram of an example system for augmented situational awareness.

As shown in FIG. 1A, in some implementations, the sensor hub 102 may be configured to attach to a helmet 104. By attaching to a helmet, or other contemplated wearable device, the sensor hub 102 may be able to capture data from various sensors in the sensor hub 102 during a jump or other application by the user. In some implementations, the sensor hub 102 may include, among other things, a communication unit 108, a power supply 110, a power supply container 112, a strobe device 114, a processor 120, memory 124, power supply connection point 130, an inertial measurement unit ("IMU") 132, and/or a location sensor 140.

Figure 1B:
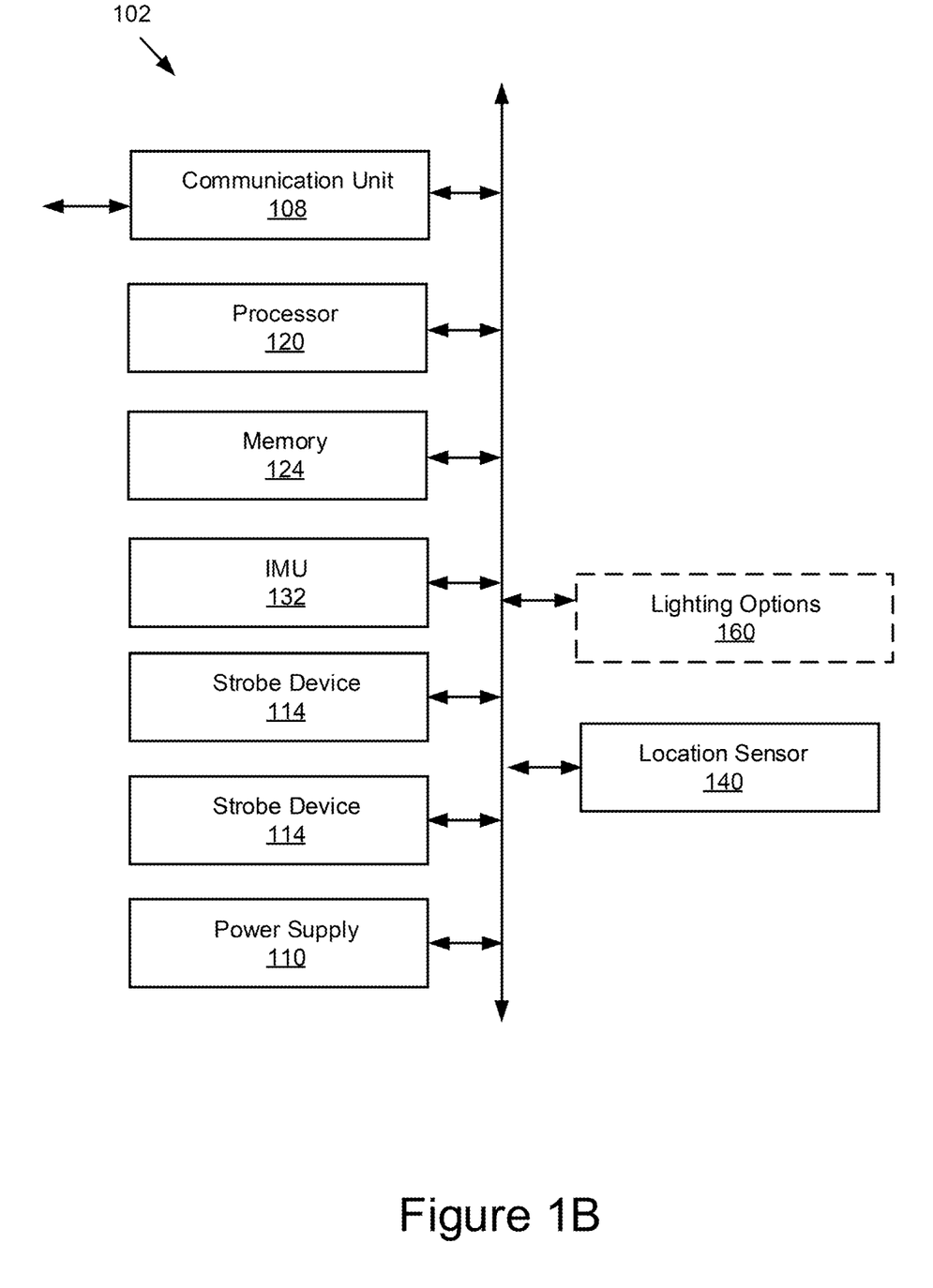

As shown in FIG. 1B, the sensor hub 102 includes one or more computing devices having data processing and communication capabilities. The sensor hub 102 may couple to and communicate with other sensor hubs 102 or other entities of the system using the communication unit 108 via the network gateway 428, as described with respect to FIG. 4. In some implementations, the sensor hub 102 may also be configured to directly with other devices, such as wearable or display devices (e.g., via Bluetooth or Wi-Fi).

The processor 120 may execute software instructions by performing various input, logical, and/or mathematical operations. The processor 120 may have various computing architectures to method data signals (e.g., CISC, RISC, etc.). The processor 120 may be physical and/or virtual, and may include a single core or plurality of processing units and/or cores. In some implementations, the processor 120 may be an Edge CPU. In some implementations, the processor 120 may be coupled to the memory 124 to access data and instructions therefrom and store data therein. A bus may couple the processor 120 to the other components of the sensor hub 102 including, for example, the memory 124, and the communication unit 108.

The memory 124 may store and provide access to data to the other components of the sensor hub 102. The memory 124 may be included in a single computing device or a plurality of computing devices. In some implementations, the memory 124 may store instructions and/or data that may be executed by the processor 120. The memory 606 is also capable of storing sensor data and other information for operating the sensor hub 102, including, for example, an operating system, hardware drivers, other software applications, databases, etc. The memory 124 may be coupled for communication with the processor 120 and the other components of sensor hub 102.

The memory 124 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 120. In some implementations, the memory 124 may include one or more of volatile memory and non-volatile memory (e.g., RAM, ROM, hard disk, optical disk, SD card, etc.). It should be understood that the memory 124 may be a single device or may include multiple types of devices and configurations.

The communication unit 108 may include one or more interface devices (I/F) for wired and wireless connectivity among the components of the sensor hub 102. For instance, the communication unit 108 may include, but is not limited to, various types known connectivity and interface options. The communication unit 108 may be coupled to the other components of the sensor hub 102. The communication unit 108 can provide other connections to the network gateway 428, see FIG. 4, and to other entities of the system using various standard communication protocols. In some implementations, the communication unit 108 may include may capable of receiving, projecting, and/or transmitting sensor information using Wi-Fi, Bluetooth, NFC, RFID, Lora WAN, SATCOM, cellular, secure cellular, mesh network, VHF, UHF, near filed magnetic induction communication, black tooth, or other radio, and/or may include wired communication units. In some implementations, the communication unit 108 may include an additional passive antenna to back up an active detection package that is broadcast using the communication unit 108. This passive antenna may provide asset position after the active system of the communication unit 108 has suffered partial and/or complete decay.

The power supply 110 may be located within the power supply container 112, which may be a portion of a housing of the sensor hub 102. The power supply 110 may be one or more battery configurations that allow other components of the sensor hub 102 to draw power from the power supply. In some implementations, the power supply 110 may be replaceable, such as by adding in new batteries, in order to quickly replace the power supply 110. In some implementations, solar recharging cells may be integrated into the sensor hub 102 or connectable to the sensor hub 102 in order to recharge the power supply 110. In some implementations, the power supply connection point 130 may be an access point on the sensor hub 102 where peripheral devices can be connected in order to draw power from the power supply 110. In some implementations, the power supply 110 may power the sensor packages, lighting, strobes, computing sources, communication, cameras, night-vision devices, as well as any front helmet lenses that support infrared and/or thermal spectrums.

The strobe device 114 may be positioned on the sensor hub 102 in order to display a strobe or other lighting device on the sensor hub 102. The strobe device 114 may be a visible or infrared strobe device that emits a light out of the strobe device 114. In some implementations, the strobe device 114 may be mounted on the sensor hub 102 in order to locate the strobe device 114 on a rear of the helmet 104. In some implementations, the strobe device 114 may be removable and may be attached to the sensor hub 102 as needed. In some implementations, the strobe device 114 may be a smart strobe and may be configured to emit specific strobe patterns based on various criteria, such as to allow additional units to follow the smart strobe during a jump, or to signal different configurations or changes during the jump.

The inertial measurement unit ("IMU") 132 may be a device that measures and reports one or more of the force, angular rate, orientation, etc. using a combination of accelerometers, gyroscopes, or magnetometers. The IMU 132 may be able to determine orientation and/or velocity of the sensor hub 102 using the accelerometers, gyroscopes, and magnetometers and provide the sensor data to other components of the sensor hub 102.

The location sensor 140 may be able to determine location data or location information of the sensor hub 102. In some implementations, the location sensor 140 may use GPS coordinates from triangulation or various other signals or the GPS satellite network in order to determine a location of the sensor hub 102 in substantially real-time. In some implementations, the sensor hub 102 may include an altitude sensor configured to capture altitude data during an event.

In some implementations, the sensor hub 102 may additionally include a lighting system 160 such as forward flood lighting or area lighting. In these implementations, a lighting component may be connected to the power supply 110 and may be directed based on the direction and type of light to emit light in order to achieve the forward flood lighting and/or area lighting. In some implementations, the lighting options may be controlled via a button or other control mechanism on the sensor hub 102. In some implementations, the sensor hub may include on or more cameras of visible, IR, and/or thermal spectrums that can be integrated into additional sensor capabilities and/or software calibration specific to an individual user.

Figure 2:
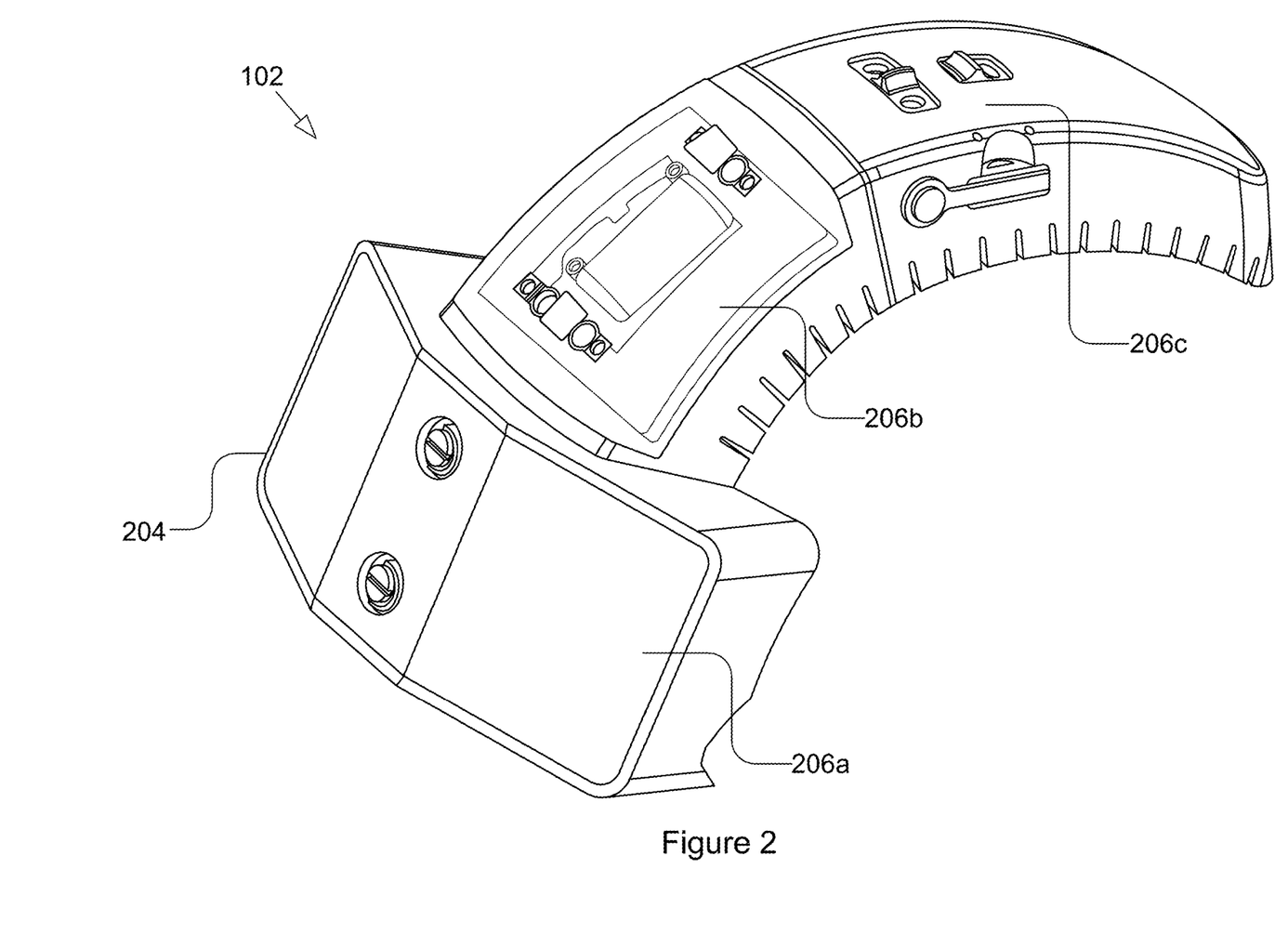
FIG. 2 is an example of a sensor hub for augmented situational awareness.

As shown in FIG. 2, the sensor hub 102 may be removable and may attach to various objects, such as a helmet, or a passive load, being dropped without a human operator. The sensor hub 102 may include a housing 204 in which the various components and/or sensors of the sensor hub 102 are positioned. The housing 204 may protect the various components from damage or wear, such as during a jump, etc. In some implementations, the sensor hub 102 may have a curved bottom on the housing 204 which allows the sensor hub 102 to be mounted on a helmet or other device. It should be understood that the sensor hub 102 could include various other configurations, such as a flat bottom, for mounting on a load, or a chest/arm of a user, in these other configurations. In some implementations, the housing 204 may include various access points 206a-206c, which may be removed to access and/or replace various components of the sensor hub 102. In further configurations, the access points 206a-206c may be translucent or clear, such as 206b in FIG. 2, in order to allow the strobe device 114 or other lighting options to shine through the access point 206b. In further implementations, the access points 206a-206c may be clear in order to easily view various components protected by the access points 206a-206c. As shown in FIG. 2, in some implementations, one or more buttons 208 or other actuatable devices may be included in the sensor hub 102 in order to allow the user to quickly turn various components of the sensor hub 102 on or off.

Figure 3A:
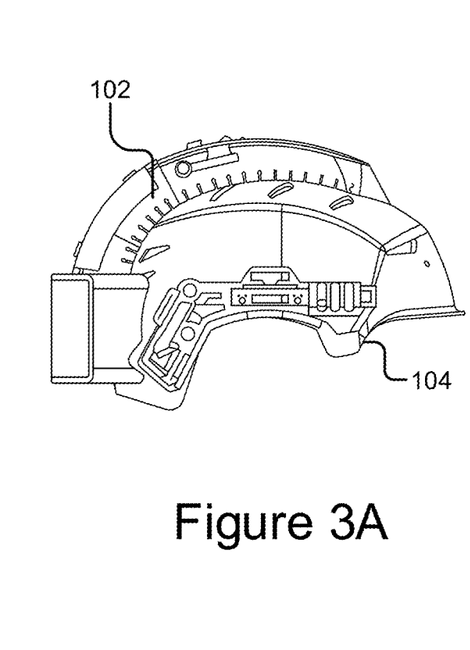
FIGS. 3A-3C are an example of a sensor hub attached to a helmet for augmented situational awareness.
Figure 3B:
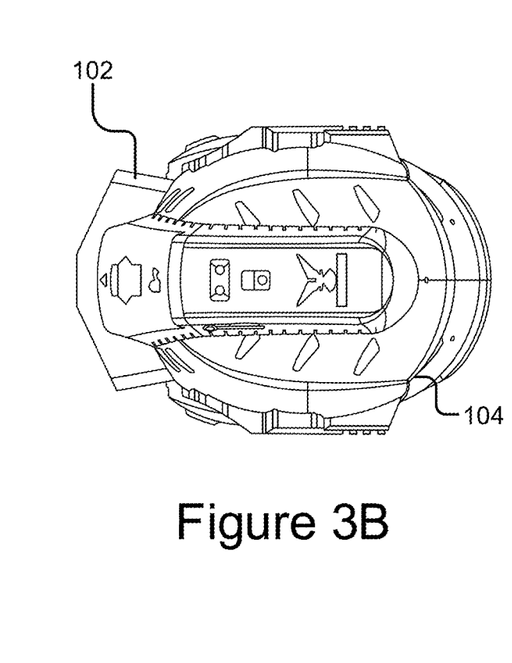
Figure 3C:
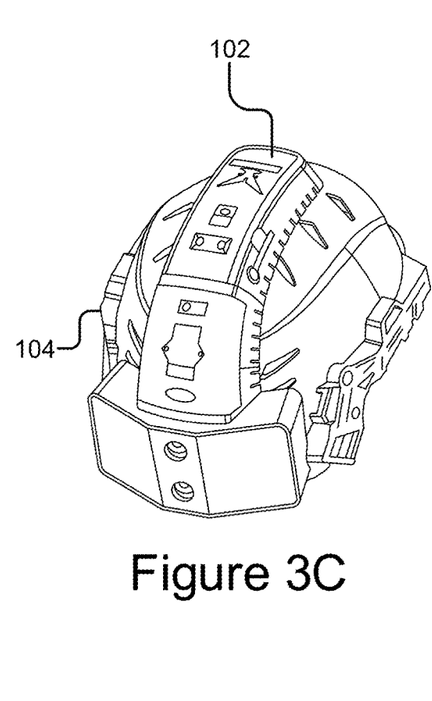

FIGS. 3A-3B show various configurations of a sensor hub 102 mounted to a helmet 104. FIG. 3A shows a left side view of the sensor hub 102 mounted to a helmet 104. In this example, the sensor hub 102 extends down to the back of the helmet 104. In some implementations, having the sensor hub 102 mounted towards the back of the helmet 105 allows for more even weight distribution, by locating heavy components, such as the power supply 110 on the rear of the helmet 104. In further implementations, it also has additional gear, such as goggles or a HUD (not shown) to be positioned on a front-side of the helmet 104, where they are more accessible to a user. FIG. 3B shows a top view of the sensor hub 102 mounted to the helmet 104. As shown, in some implementations, the sensor hub 102 may be centered along the top point of the helmet 104 and extend down the back side of the helmet 104. FIG. 3B shows a left-rear perspective view of the sensor hub 102 mounted to a helmet 104. As shown, in some implementations, the helmet 104 may be designed to coupe to the sensor hub 102, such as with fastening devices, or with quick attachment mechanisms. In further implementations, the sensor hub 102 may be integrated directly into the form factor of the helmet 104. In further implementations, the sensor hub 102 may be configured to mount to existing helmets, such as parachutist helmets currently in use by various organizations.

Figure 4A:
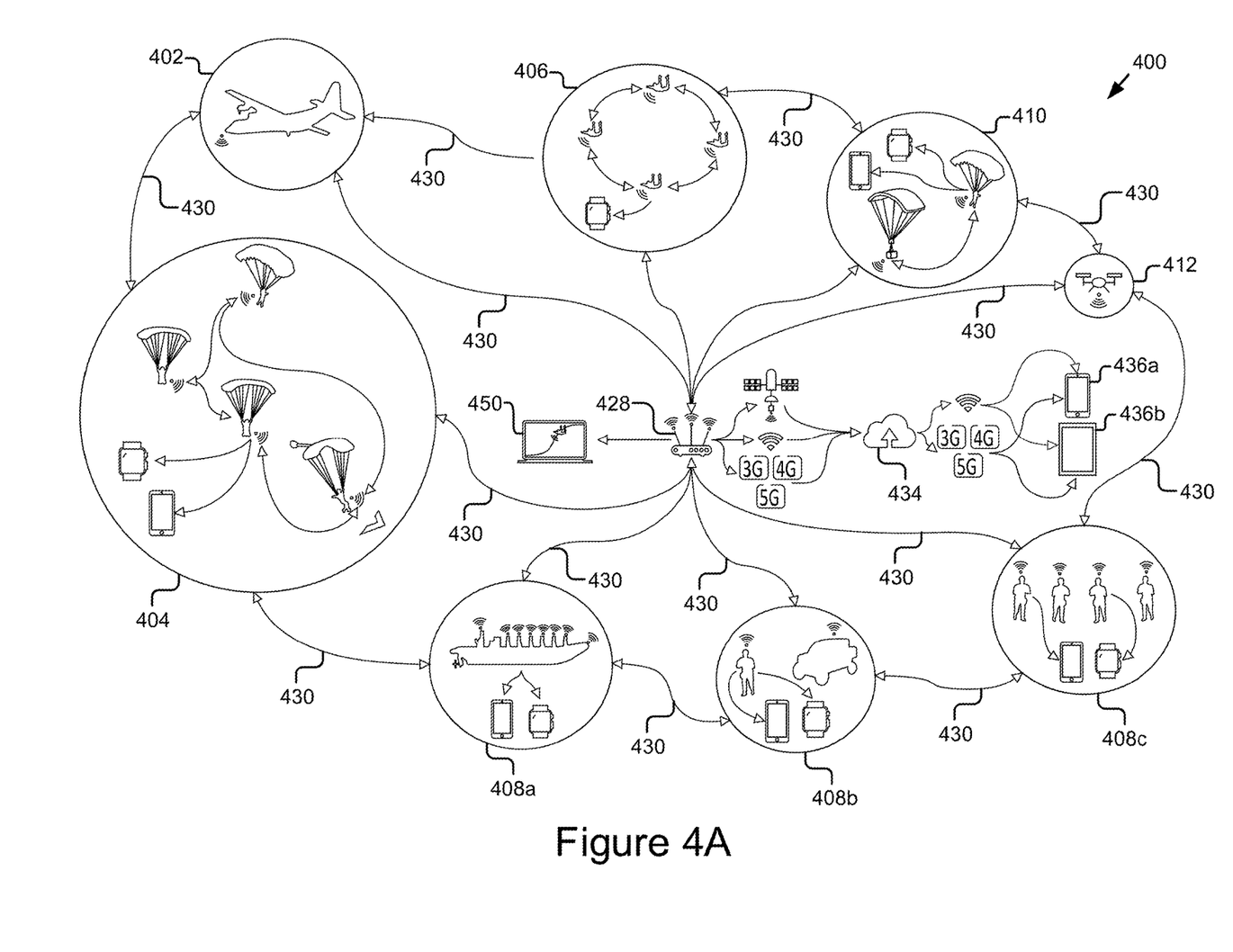
FIGS. 4A-4C are an example of a system for augmented situational awareness using a sensor hub.

FIG. 4A is a diagram of an example system 400 that uses the sensor hub 102. As shown in the example system. A plurality of sensor hubs 102 are depicted in FIG. 4 to indicate that the network gateway 428 and its components may aggregate information about and provide data associated with the systems and processes described herein to a multiplicity of users on a multiplicity of devices as shown. A sensor hub 102 may establish or maintain a wired or wireless connection with the other devices via the communication unit 108 of the sensor hub 102.

At block 402, a vehicle, such as an airplane, may be positioned to drop one or more loads, such as a human load or a passive non-human load. In some implementations, the loads may be configured with a sensor hub 102, such as mounted to a helmet or other configuration. At block 402, the vehicle may communicate with various other components of a network using Lora WAN or other appropriate low power, wide area networking protocols.

At block 404, one or more users under canopy may communicate data from their sensor hub 102 to various other components of the network using Lora WAN or other appropriate low power, wide area networking protocols. The one or more users under canopy may be able to receive data from the sensor hub 102 to another device, such as a wearable or display on a computing device using a Bluetooth communication protocol or other appropriate low power communication. The sensor hub 102 may allow the one or more users under canopy to receive various data about their jump/flight pattern, such as altitude, location, barometric pressure, velocity, sensor orientation, visual information via visible and non-visible spectrums, and/or temperature. In some implementations, the sensor hub 102 may be able to provide this real-time sensor information to the wearable or mobile device. In further implementations, the sensor information may be provided to a HUD for display directly to the user during the flight. A user under canopy may be able to user the various information to correct aspects of their flight path or provide real-time updates to others in the network about changes in the flight path, etc. In some implementations, an artificial intelligence package may be included that can provide advice and/or assistance to a user in real-time flight control and management while the user is under canopy.

At block 406, one or more users in free fall may communicate data from their sensor hub 102 to various other components of the network using Lora WAN or other appropriate low power, wide area networking protocols as depicted by signal lines 430. The one or more users in freefall may be able to receive data from the sensor hub 102 to another device, such as a wearable or display on a computing device using a Bluetooth communication protocol or other appropriate low power communication. The sensor hub 102 may allow the one or more users during freefall to receive various data about their jump/flight pattern, such as altitude, location, barometric pressure, velocity, sensor orientation, visual information via visible and non-visible spectrums, and/or temperature. In some implementations, the sensor hub 102 may be able to provide this real-time sensor information to the wearable or mobile device. In further implementations, the sensor information may be provided to a HUD for display directly to the user during the flight. A user during freefall may be able to use the various information to correct aspects of their flight path or provide real-time updates to others in the network about changes in the flight path, etc. In some implementations, an artificial intelligence package may be included that can provide advice and/or assistance to a user in real-time flight control and management while the user is under canopy.

At block 408, one or more users under canopy and one or more passive loads under canopy may communicate data from their sensor hub 102 to various other components of the network using Lora WAN or other appropriate low power, wide area networking protocols as depicted by signal lines 430. The one or more users under canopy or the one or more passive loads may be able to receive data from the sensor hub 102 to another device, such as a wearable or display on a computing device using a Bluetooth communication protocol or other appropriate low power communication. The sensor hub 102 may allow the one or more users under canopy to receive various data related to the passive load about their jump/flight pattern, such as altitude, location, barometric pressure, velocity, sensor orientation, visual information via visible and non-visible spectrums, and/or temperature. In some implementations, the sensor hub 102 may be able to provide this real-time sensor information to the wearable or mobile device. In further implementations, the sensor information may be provided to a HUD for display directly to the user during the flight, such as a flight path of the passive load or an estimated landing location. A user under canopy may be able to use the various information to correct aspects of their flight path or provide real-time updates to others in the network about changes in the flight path, etc. In some implementations, an artificial intelligence package may be included that can provide advice and/or assistance to a user in real-time flight control and management while the user is under canopy.

At block 412, a monitoring device, such as a drone may be included in the system and may communicatively couple to other components of the network, such as via signal line 430 using the Lora WAN or other appropriate low power, wide area networking protocols. The monitoring device may be configured to receive flight plan or other sensor data from either a user or a load via the sensor hub 102 and can actively monitor the user and/or load. In some implementations, the monitoring device may be used for asset recovery or asset tracking, such as to identify where a load or user has landed, by receiving real-time information from a sensor hub 102 of the load and navigating to that location for monitoring using the real-time information from the sensor hub 102.

As depicted in FIG. 4, a network gateway 428 may receive the various signals from the other components of the system. The network gateway 428 may include any number of networks and/or network types. For example, the network gateway 428 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. In some implementations, the network gateway 428 may communicate using a Lora WAN communication protocol. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols. The network gateway 428 may provide information to a ground control station 450, such as via a Bluetooth or other communication mechanism. In some implementations, the network gateway 428 may provide information to a cloud-based server 434, such as by using a SATCOM, Ethernet/Wireless, or 3G/4G/5G network signal. The cloud-based server 434 may provide information via an Ethernet/Wireless protocol or 3G/4G/5G network signal to one or more end-user devices 436. These end-user devices 436 may allow remote users to access the sensor data of one or more sensor hubs 102 via the cloud-based server 434 in order to provide substantially real-time updates to an end-user device 436. Examples of end-user devices 436 may include, but are not limited to, mobile phones, tablets, laptops, desktops, netbooks, server appliances, servers, virtual machines, TVs, etc.

At block 408, one or more other users of the system may access the real-time sensor data from the sensor hub 102 via the network gateway 428. For example, as shown in 408a, a ship or other water-based vehicle may receive the sensor data to assist in operations, such as asset recovery or asset tracking. As shown in 408b, a ground-based vehicle and user may receive the sensor data to assist in operations, such as asset recovery or asset tracking. As shown in 408c, one or more ground-based teams may receive the sensor data to assist in operations, such as asset recovery or asset tracking. By providing substantially real-time sensor data to other users, recovery of lost jumpers or equipment can be quickly executed by providing substantially real-time locations and trajectories of various jumpers.

Figure 4B:
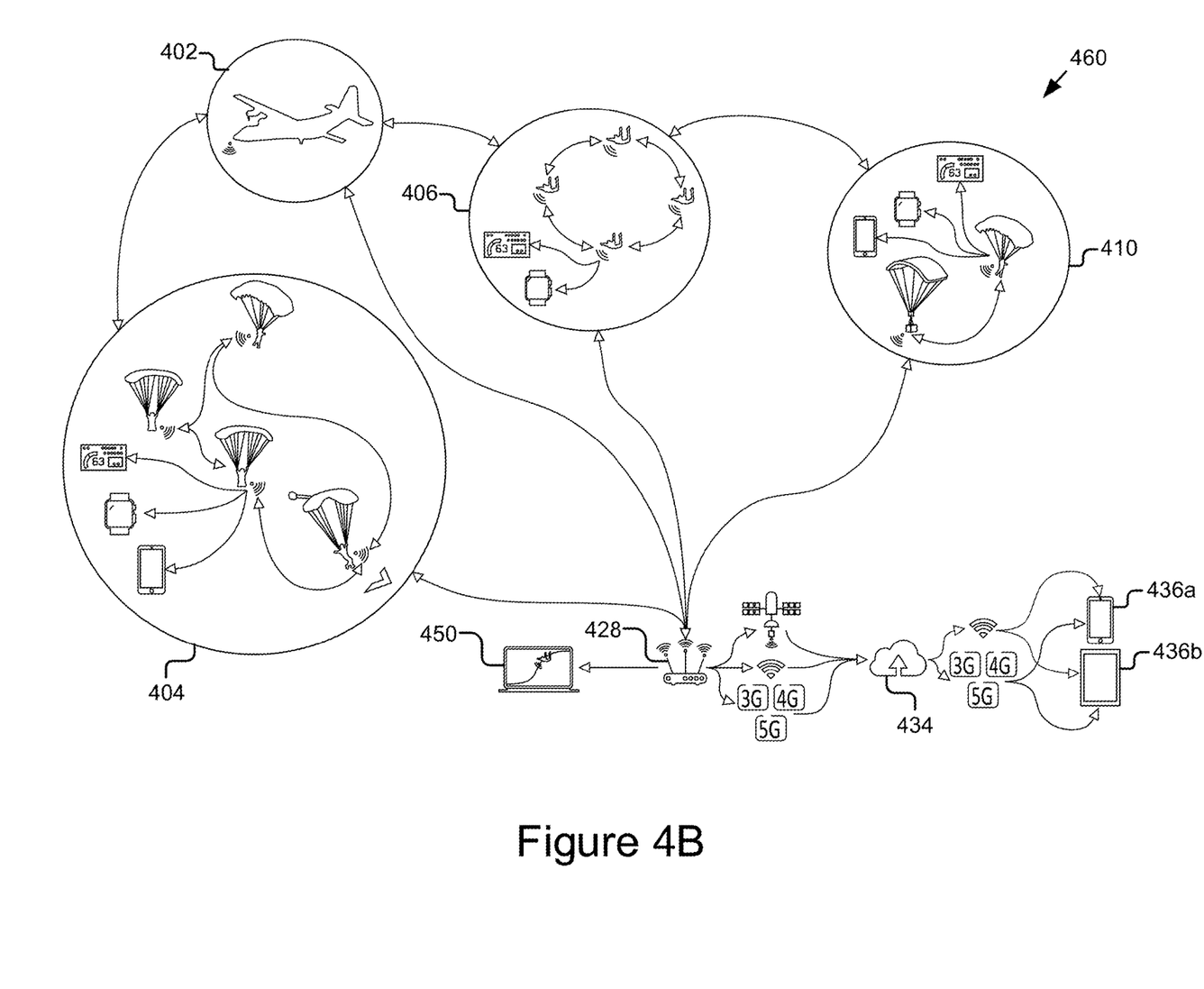

FIG. 4B is an example system 460 that depicts various HUD at each of the blocks 404, 406, and 410. In this example implementation, sensor data capture by the sensor hub 102 is sent to a HUD display for the user using the communication unit 108. The sensor data may be sent in one implementation using a Bluetooth connection and it allows a user to view the sensor data at various points through a jump. The sensor data is also shared with the network gateway 428 to other devices of the system 460.

Figure 4C:
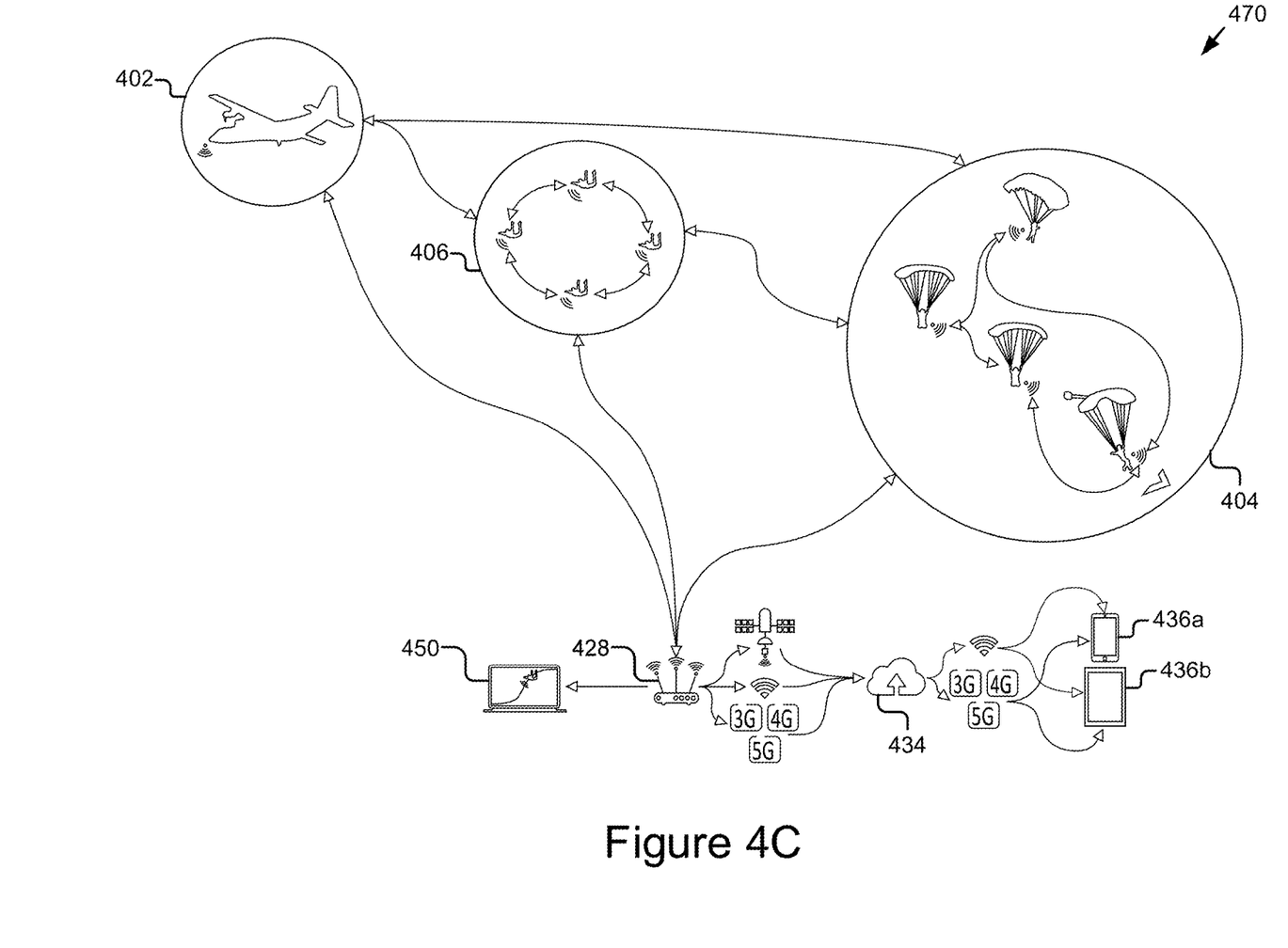

FIG. 4C is an example system 470 that depicts one or more users of the sensor hub 102 during the free fall stage as shown at block 406 and then under canopy as shown at block 404. During the different stages, the user may receive various sensor data from the sensor hub 102 in substantially real-time. In some implementations, the sensor data may also be shared with other users of the system 470 as shown, such as via the network gateway 428.

Figure 5:
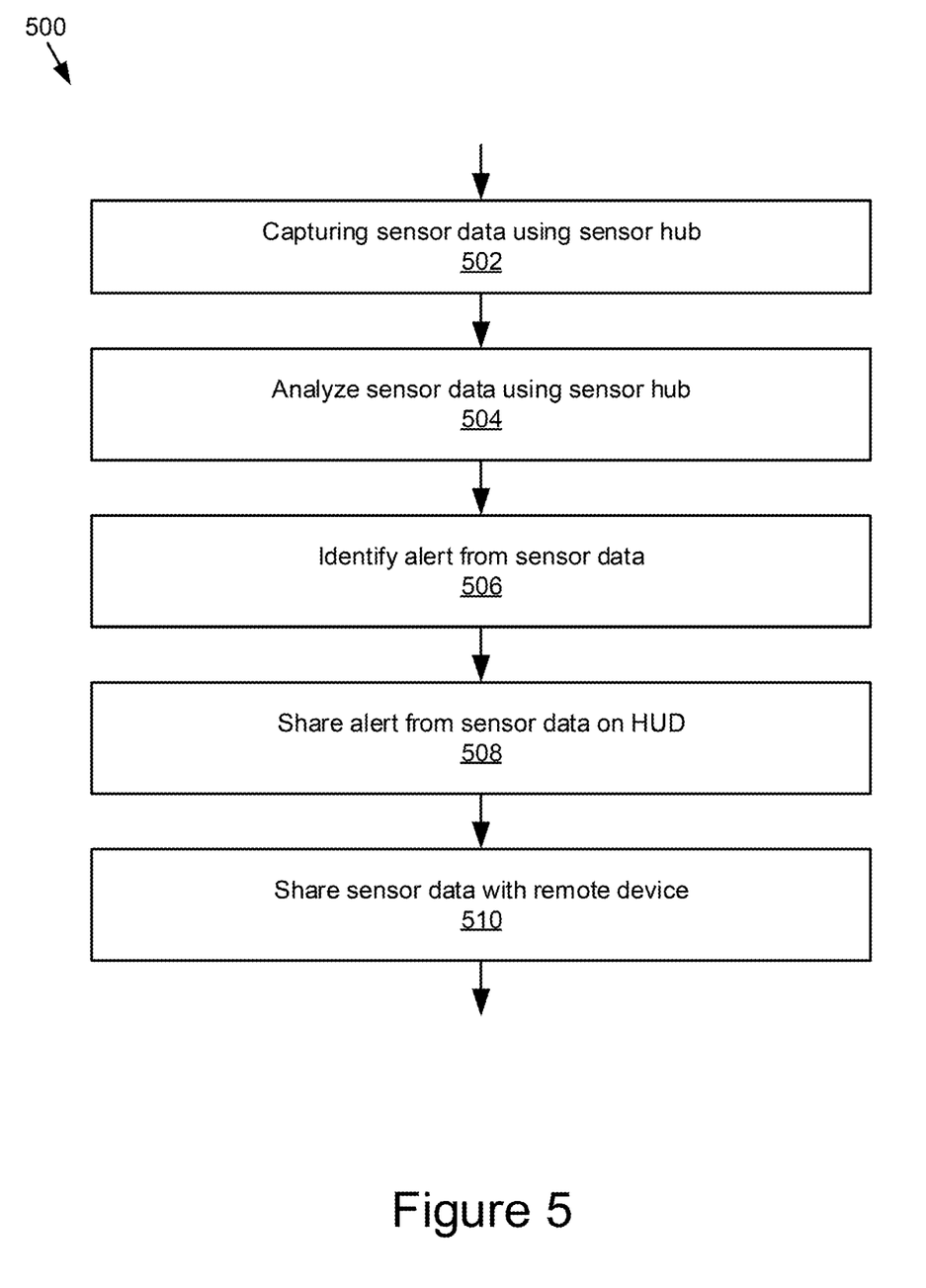
FIG. 5 is a flowchart of using a sensor hub for augmented situational awareness.

FIG. 5 is an example method 500 for capturing data using the sensor hub 102. At 502, the sensor hub 102 captures sensor data using the one or more sensors. For example, the sensor hub may be connected to a helmet of a user jumping out of an airplane with a parachute. As the user exits the airplane and enters the freefall stage, the various sensors of the sensor hub 102 may capture one or more altitude, location (such as GPS coordinate), barometric pressure, velocity, sensor orientation, visual information vis visible and non-visible spectrums, and temperature. This sensor data may be stored on the sensor hub 102 and in some implementations, at 504, the processor 120 may analyze the sensor data of the sensor hub 102.

At 506, the processor 120 may use the analysis of the sensor data to identify one or more alerts from the sensor data. For example, the sensor data may be compared to an ideal jump or model of an ideal jump and/or expected sensor data of the ideal jump and if any of the sensor data exceeds a threshold of what is considered ideal from the ideal jump, the processor 120 may flag that data as an alert. Alerts may include a deviation in one or more of the location, velocity, altitude, etc. At 508 the alerts may then be shared with the user by the processor 120 using a HUD. For example, if the velocity has exceeded a threshold value, then an alert may be presented to the user on the HUD that the velocity has been exceeded. This may allow the user to act on the instructions in substantially real-time. In further implementations, a combination of sensor data may be analyzed by the processor 120 in order to determine an alert. For example, the velocity, location, and barometric pressure may all be analyzed as a whole to identify if the velocity is normal for that location and that barometric pressure. By combining inputs from multiple sensors, the sensor hub 102 is able to identify trends in the data that was not previously available and allows for autonomous or semi-autonomous identification of trends using the various sensor inputs.

At 510, the sensor hub 102 shares the data with another remote device, such as another sensor hub 102 or other users on a network as described with respect to FIG. 4A. In another example, a strobe of a first user may be captured using a camera of the sensor hub 102 on a second user. The sensor hub 102 may combine the captured strobe information along with location data of the first user and the second user shared using the communication unit 108 of each user's sensor hub 102, in order to determine how close the users are during freefall or under canopy as well as an overall landing trajectory of each user. This combined data that is shared between the users, expands the capability of each user during free-fall or under canopy, when normal situations would not allow for this type of data analysis by the user.

In some implementations, the sensor hub 102 may provide a black box device that records and communicates sensor data during parachuting or wing-suit operations. This black box device may serve a purpose similar to accident recording systems in fixed wing and rotary aircraft, however it is capturing additional data from the parachuting or wing-suit operations that is relevant to those operations. In further implementations, the sensor hub 102 may also provide the user, operators in the vicinity, and over the horizon leadership with substantially real-time information during the parachuting event or wing-suit flying event.

In some implementations, the sensor hub 102 may communicate using the communication unit 108 with the US Department of Defense asset awareness communication infrastructure or other asset tracking vested interests. This allows for the assets the sensor hub 102 is mounted on to be tracked in substantially real-time and allows for the quick recovery and locating of the assets, such as a jumper or load in case of an accident. This improves on the existing ability of systems to locate assets, where the resources to find an asset far exceed what it would cost to use the sensor hub 102.

In some implementations, the sensor package of the sensor hub 102 may supply the sensor data on a display via the HUD or night vision goggles (for example, PVS 31's or 36's) that shows the user the flightpath, landing pattern of the jumper or flyer based on information collected by the sensors. In some implementations, visual or audio alerts may be integrated into the display in a spread loaded display so as not to overwhelm the user viewing the information. The sensor information may include position, acceleration, gyro, airspeed, barometric pressure, humidity, temperature. This sensor data is capable of increasing the overall awareness of the jumper and or any Command Asset Awareness (C2). In some implementations, the sensor hub 102, or remote processing, may include an artificial intelligence package that can analyze the sensor data and advise or assist the user for real-time flight control and management.

In further implementations, the long-term acquisition of sensor data using the sensor hub 102 allows for improved analytics of various design configurations. For example, parachute designs may be updated based on the analysis of various jump and sensor data combinations to identify ideal parachute designs for different operations.

In an example embodiment, the sensor hub 102 may use the processor 120 as a computer processing unit serving as an onboard computer. The computer processing unit may allow the onboard computer to secure bridging of alternative communication networks using the communication unit 108. In further implementations, the onboard computer may allow for black box or zeroizing protocols. In some implementations, the onboard computer may be used for redundant mission planning, allow for defaults and/or fallback mission plans to be preprogrammed or automatically determined as the sensor data is captured. In some implementations, the onboard computer may use advanced local and link encryption in order to protect the sensor data along the transmission and local storage. In some implementations, the onboard computer may have autonomy using machine learning over sensor computer vision or other applications of artificial intelligence. In some implementations, the onboard computer may use GPS denial software applications.

In some implementations, the sensor hub 102 may use navigation that has GPS with failover capability to a redundant GPS unit. In some implementations, sensor hub 102 may use a back-up algorithm position prediction using the IMU 132 sensor data. In some implementations, the sensor hub 102 may use a system attitude, with altitude and other data metrics that enhance multipoint positioning and navigation. In some implementations, the sensor hub 102 may have on demand redirect offers command authority to update mission plan, direct control attitude of flight operations, and/or manipulate communications or computer based functions. In some implementations, the sensor hub 102 may use Pakam safety avoidance protocols.

In some implementations, the network gateway 428 may be agnostic to the downlink/communications unit 108, which allows users of the sensor hub 102 multiple telemetry paths in order to increase redundancy and multi-path capabilities. In one example, a primary path may be Lora WAN, with an alternate path of broadband cellular (tactical network or commercial terrestrial), a contingent path may be SATCOM, and an emergency pat may be VHF/UHF. In some implementations, the bridged radio may be an agnostic tie into the communications link of the sensor hub 102 for further growth and future capabilities while in the air or on the ground. In some implementations, multiple avenues for telemetry control are offered with the sensor hub 102. Primary telemetry is conducted over the RF radio until the package exceeds the capability of the link. Once the RF link is broken and the flight controller no longer receives acknowledgement from the command node, the flight controller of the sensor hub 102 may autonomously shift to an alternate telemetry unit, currently offered over satellite communications. Other methods of telemetry may be used to control the sensor hub 102 with more than two methods. Primary, Alternate, Contingent, and Emergency methods of telemetry are capable with the sensor hub 102 to ensure telemetry and video connection is never lost to the airborne package.

In some implementations, the sensor hub 102 has the black box (zeroize) protocol as a software integrated encrypted black box for post-processing of flight routes, error codes, flight logs, etc. In some implementations, the software includes the ability to erase history, location tracks, etc. upon pirating or the identification of external manipulation or exploit. In some implementations, the sensor hub 102 may be command wiped, with a deep solid state overwrite on final delivery, crash, or command. This command may be provided as an option for the user of the sensor hub 102.

In some implementations, the technical hardware of the sensor hub 102 may include a case or/container structure, such as the housing, a flight controller (IMU 132 and ancillary flight sensors), location sensors 140, such as a primary RTK GPS and/or a secondary RTK GPS, a processor 120, such as an edge CPU, a memory 124, such as an SD card, a communication unit 108 that includes a $5^{th}$ generation Bluetooth multiconnect, wi-fi, radio (for telemetry/video) communications and SDR, a forward facing lighting, rear facing strobe with infrared and/or visible light, and/or a dual inertial measurement unit that measures one or more of altimeter, accelerometer, magnetometer, gyroscope, barometric pressure, and/or temperature.

No current systems offer the ability to conduct mission planning to include, altitude release, precision landing, abort criteria, or alternative routes to be determined by the sensor hub 102, which include but is not limited to autonomous flight profile changes conditioned to wind alterations in the planned cone of attack to adjust flight parameters to duration, distance of coverage, etc. This provides the sensor hub 102 a unique level of efficiency not currently configured on any system of its kind.

In some implementations, the sensor hub 102 is able to integrate with current mesh networks, protocols and required encryption methodologies of various military organizations. This is provided by a communication unit 108 that is agnostic to the terrestrial or space communications it is tied into. Encryption may be managed on the device via the appropriate radio module or may be managed from distance over an IP based tunnel or virtual private network method to encrypt telemetry and video traffic to and from each sensor hub 102 nodal module and or gateway device.

In some implementations, the sensor hub 102 utilizes a method of autonomous failover. Without human involvement, the processor 120 of the sensor hub 102 measures packet acknowledgement from the distant end and determines the most optimal and efficient communication path. These methods, paths, communications relays, frequencies, or other various means of digital or analog telemetry and/or video include but are not limited to; mesh networks, direct RF down links, Satcom, relay communications, and/or mobile broadband. This includes any combination of the aforementioned. If one connection is severed, the communication unit 108 autonomously reconnects over another medium.

In some implementations, the processor 120 of the sensor hub 102 may include software that has ortho-geologic flight profiles that maintain lift/altitude along long axis geological formations. In some implementations, the software may include parameters for safety and avoidance, safe space redirection in case of loss of connection, smart redirect in the event of environmental disturbance outside of the physical capability of the system to achieve objective geofence. In some implementations, the software may include passive autonomy provided by commercial and/or military mission planning software. The autonomous mission planning offers precision point and/or multi-point payload delivery over a vast geographic space. In some implementations, the software may allow for interoperability with ATAK/CIVTAK.

As described with respect to FIGS. 4A-4C, the sensor hub 102 may be monitored directly by a common or universal ground control station 450. In some implementations, various flight control applications may be used by the nature of using the sensor hub 102 MAVLink protocol. In some implementations, a user under canopy, from the aircraft, on the ground, or in space, may use various ground control software to view status and sensor data of each of the sensor hub 102 components in the system.

In some implementations, the power supply 110 of the sensor hub 102 incorporates a redundant method of power by including redundant batteries that meet universal shipping and hazmat certifications for airborne and seaborne freight. The energy chemistry of the battery is not exclusive to lithium polymer and may change in size, weight, capacity, and chemical makeup. Redundancy is included to ensure power is maintained to the sensor hub 102 system in the event of fault or power failure.

Some implementations of the sensor hub 102 may include a system that incorporates all sensors, communication, hardware, software, cameras, power supply, head-up display and lighting solutions in a single non-ballistic & ballistic rated helmet form factor that will be available in a range of sizes. The system provides a sensor mounting solution that attaches to the helmet, such as via a Velcro-patching system. In some implementations, the sensor and lighting system package may include; but not be limited to, sensors to record; altitude, location (GPS Coordinates), barometric pressure, velocity, sensor orientation, visual information via visible and non-visible spectrums, and temperature. In some implementations, the system may be further configured to send real time sensor information to an integrated heads up display as well as over the horizon data transmission via client required means using; Iridium, Cellular, secure cellular LTE, Mesh Network, VHF, UHF, Near field magnetic induction communication, Bluetooth, Wi-Fi, black tooth etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 10 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. An augmented situational awareness helmet comprising:
   a removable sensor hub housing, the removable sensor hub housing including a power supply and a second cavity that houses a first sensor and a second sensor that are configured to capture sensor data; and
   a helmet that attaches to the removable sensor hub housing to secure the removable sensor hub housing while the helmet is worn by an operator, wherein, the first sensor and the second sensor capture sensor data in substantially real-time while the helmet is worn by the operator.

2. The augmented situational awareness helmet of claim 1, further comprising:
   a processor configured to determine real-time instructions based on the captured sensor data from the first sensor and the second sensor; and
   a heads up display connected to the helmet, the heads up display providing the real-time instructions to the operator.

3. The augmented situational awareness helmet of claim 1, wherein the augmented situational awareness helmet is a first helmet, the first helmet further comprising:
   a communication unit configured to communicate with a second helmet.

4. The augmented situational awareness helmet of claim 1, wherein the first sensor is an inertial measurement unit that measures one or more of a velocity and an orientation of the removable sensor hub.

5. The augmented situational awareness helmet of claim 1, wherein the second sensor is a location sensor and the location sensor is configured to determine location information of the removable sensor hub.

6. The augmented situational awareness helmet of claim 1, wherein the helmet may include a front helmet lens that may be looked through when the helmet is worn by the operator.

7. The augmented situational awareness helmet of claim 6, wherein the front helmet lens supports one or more of an infrared spectrum and a thermal spectrum.

8. The augmented situational awareness helmet of claim 1, wherein the removable sensor hub includes a lighting system that emits a light out of the lighting system.

9. The augmented situational awareness helmet of claim 8, wherein the lighting system may be controlled using a button on the removable sensor hub.

10. The augmented situation awareness helmet of claim 1, wherein the removable sensor hub includes a camera integrated into the removable sensor hub.

11. The augmented situational awareness helmet of claim 10, wherein the camera can view one or more of a visible spectrum, an infrared spectrum, and a thermal spectrum.

12. The augmented situational awareness helmet of claim 1, wherein the removable sensor hub is mounted towards a back side of the helmet to balance a weight distribution on the helmet.

13. A method of capturing sensor data using an augmented situational awareness hub, the method comprising:
   capturing, using a plurality of sensors of a removable sensor hub, sensor data the plurality of sensors of the sensor hub including a location sensor capturing location data and an inertial measurement unit capturing velocity data and orientation data;
   analyzing, using a processor of the removable sensor hub, the location data, velocity data, and orientation data;
   identifying, using the processor of the removable sensor hub, a location based on the location data;
   identifying, using the processor of the removable sensor hub an alert based on the location, the velocity data, and the orientation data;
   sharing, using a communication unit of the sensor hub, the alert on a heads-up display connected to the removable sensor hub; and
   sharing, using the communication unit of the sensor hub, the sensor data with a remote device.

14. The method of claim 13, wherein the removable sensor hub is mounted to a helmet of a user.

15. The method of claim 14, wherein the removable sensor hub is a first sensor hub and the remote device is a second sensor hub of a second user.

16. The method of claim 15, wherein identifying the location based on the location data of the first sensor hub further comprises determining how close the first sensor hub is to the second sensor hub.

17. The method of claim 14, wherein the alert is a real-time instruction presented on a heads up display of the helmet.

18. The method of claim 17, wherein the real-time instruction is an alternative route.

19. The method of claim 18, wherein the alternative route is shared with the second sensor hub.

20. An augmented situational awareness hub comprising:
   an orientation sensor mounted into a sensor hub, the orientation sensor being configured to capture orientation data;
   a location sensor mounted into the sensor hub, the location sensor being configured to capture location data;
   a lighting system mounted into the sensor hub, the lighting system being configured to emit light;
   a strobe device mounted into the sensor hub, the strobe device being configured to emit a strobe;
   a processor mounted into the sensor hub, the processor being coupled to the orientation sensor, the location sensor, and the lighting system in order to receive the orientation data and the location data; and
   a communication unit mounted into the sensor hub, the communication unit being configured to receive the orientation data and the location data from the processor and transmit the orientation data and the location data to a remote device.

* * * * *